WINFORD B. CARRUTH
RALPH W. CARP
INVENTORS

BY William J. Christoforo
ATTORNEY

United States Patent Office 3,544,838
Patented Dec. 1, 1970

3,544,838
HEADLAMP TIME DELAY CIRCUIT AND MEANS
FOR ADJUSTMENT THEREOF
Winford B. Carruth and Ralph W. Carp, Baltimore, Md.,
assignors to The Bendix Corporation, a corporation of
Delaware
Filed June 6, 1968, Ser. No. 735,134
Int. Cl. B60q 1/06, 1/08
U.S. Cl. 315—83                                   9 Claims

ABSTRACT OF THE DISCLOSURE

An automotive time delay circuit which automatically turns off the headlamps a fixed time after a control switch is opened wherein a relay coil, when energized, closes relay contacts paralleling the normal headlamp switch thus connecting the headlamps to the automobile battery. An RC discharge circuit, arranged to be charged when the control switch is closed and to discharge according to its time constant when the control switch is opened, biases the gate of a field effect transistor. The field effect transistor in turn applies forward bias to a control transistor which controls the current flow through the relay coil. In one embodiment of the invention the ignition switch acts as the control switch and the relay contacts not only apply power to the headlamp circuit, but also apply power to the control transistor and the field effect transistor, thus, the relay is self-latching so that the circuit will not operate unless the ignition switch is opened before the manual headlamp switch is opened, the manual headlamp switch having shunted the latching relay contacts. In a second embodiment an auxiliary switch acts as the control switch and the control transistor is connected directly between the battery and the relay coil so that the time delay circuit will operate whenever the auxiliary switch is momentarily closed.

BACKGROUND OF THE INVENTION

This invention relates to a time delay circuit and, more particularly, to a time delay circuit for automobile headlights which will automatically turn off the headlights after a fixed time delay.

Many devices and circuits have been proposed which will allow an automobile operator to leave his lights on after the vehicle has been parked and the motor been turned off, so that he would have light enough to negotiate from his parked automobile to his front door. It becomes apparent upon a thorough investigation of the problem that certain difficulties arise in designing a commercially acceptable time delay circuit having the sufficient fail-safe characteristics for use in today's safety conscious market.

SUMMARY OF THE INVENTION

According, a time delay circuit which automatically turns off the headlamps a fixed time after a control switch is opened has been devised wherein relay contacts paralell the normal headlamp switch so that any failure which may cause these relay contacts to remain open will not interfere with normal operation of the automobile or its headlamps and any failure of the time delay circuit which causes the relay contacts to remain closed will not interfere with normal operation of the vehicle nor cause the headlamps to be extinguished.

Another object of this invention is to provide a time delay circuit for automatically turning off the vehicle's headlights which is compact in size for easy mounting behind the dashboard or under the hood of a passenger vehicle.

A still further objective of this invention is to provide a time delay circuit which automatically turns off the headlamps of a vehicle which is manufactured from common and inexpensive components and is inexpensive to assemble, calibrate and test.

DESCRIPTION OF THE PREFERRED EMBODIMENT

Figure 1:
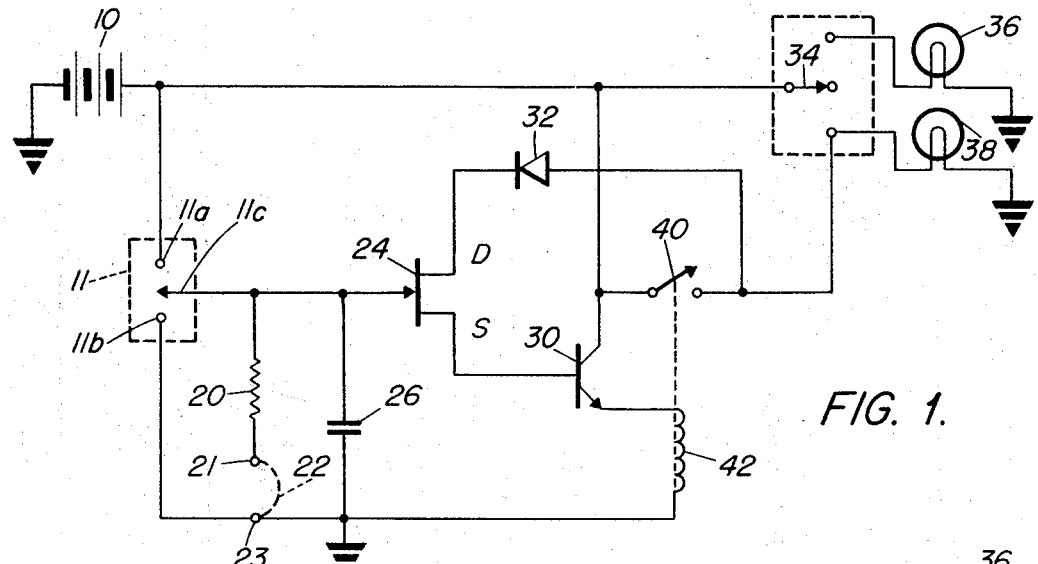
FIG. 1 is a schematic of the invention in which an auxiliary switch control actuation of the time delay circuitry.

Referring to FIG. 1, the automobile battery 10 may be connected through the normal headlamp control switch 34 to either the parking lights 36 or the headlamps 38 or both the parking lights and the headlamps may be disconnected from the battery by placing switch 34 in the off position as shown. Relay contacts 40, when closed, parallel switch 34 to connect headlamps 38 to battery 10. When pole 11c of single pole, double throw, momentary contact control switch 11 is thrown to energize contact 11a, capacitor 26 is charged to battery voltage, thus energizing the gate electrode of field effect transistor 24 which in turn forward biases transistor 30 through the gate to source diode of transistor 24. Transistor 30 thus becomes conductive and energizes relay windings 42 causing relay contacts 40 to close and apply battery voltage to the headlamps 38, and additionally to apply battery voltage through diode 32 to the drain of transistor 24. When control switch 11 is released so that it returns to its off position, capacitor 26 slowly discharges through resistor 20 and linkage 22 to ground. The function of linkage 22 will be made clear when calibration of the time delay period is discussed at a later time. It is sufficient at the present time to state only that linkage 22 comprises the chassis of the automobile in which this circuit is to be mounted with the circuitry being mounted to the chassis through mounting holes located in terminals 21 and 23. When capacitor 26 is discharged sufficiently so that the voltage at the gate of transistor 24 is no longer sufficient to cause it to conduct enough to supply the required base drive to transistor 30 to hold the relay closed, relay contacts 40 open and battery voltage is removed from the headlamps and the drain of transistor 24. After the capacitor 26 becomes completely discharged there remains no battery drain whatsoever through the circuit.

Figure 2:
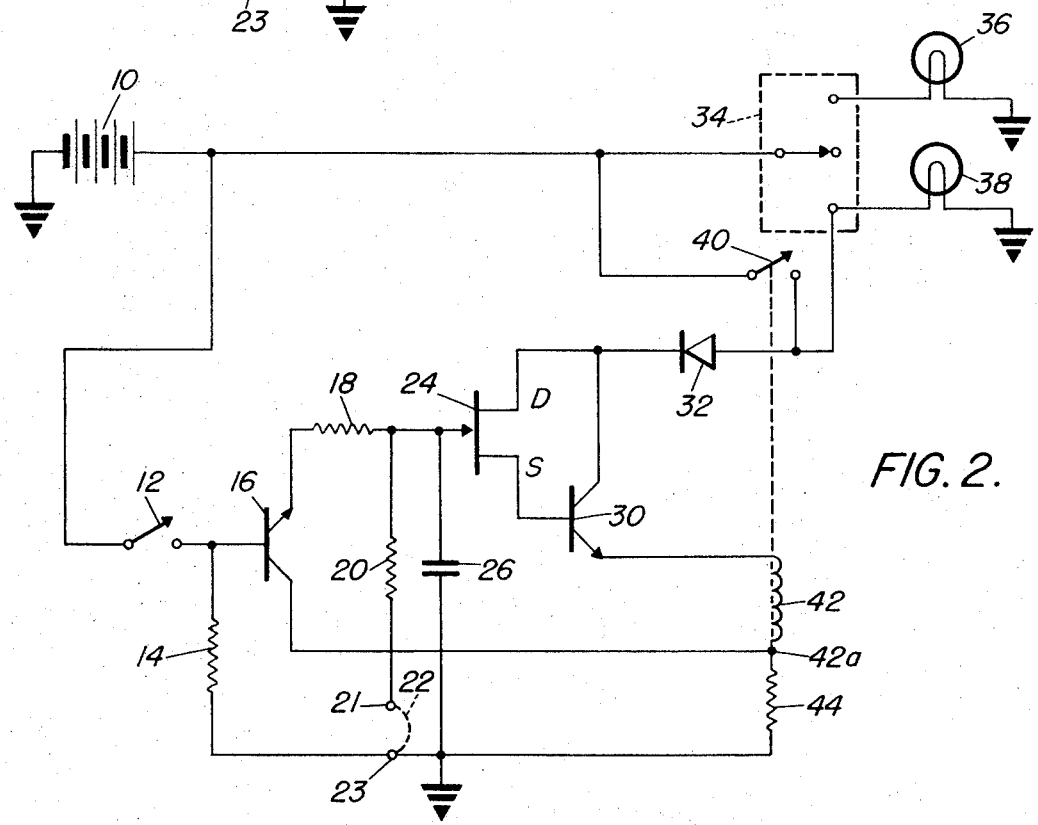
FIG. 2 is a schematic of the invention in which the normal vehicle ignition switch and the normal vehicle headlamp switch control the actuation of the time delay circuitry.

Referring now to FIG. 2 there is seen a time delay circuit similar to that shown in FIG. 1 but modified to allow the standard ignition switch to perform the functions of the auxiliary switch. Battery 10 energizes parking lights 36 or headlamps 38 through the regular headlamp switch 34. Relay contacts 40, as in the circuit previously described, parallel switch 34 to supply power from battery 10 to headlamps 38 when closed. When ignition switch 12 is closed the base to emitter diode of transistor 16 is forward-biased so that capacitor 26 is charged therethrough and through resistor 18 to approximately battery voltage. Additionally, the base to collector diode of transistor 16 is forward-biased to apply battery voltage at the low voltage end 42a of coil 42. Thus, as long as the ignition switch 12 is closed so that the voltage on point 42a is raised to battery voltage, coil 42 cannot become energized to close contacts 40. Hence, the time delay circuit will remain inoperative. If at the same time the headlights are off, diode 32 is reverse-biased so that the drain electrode of transistor 24 and the collector of transistor 30 are open circuited. If the headlamps are turned on through switch 34, diode 32 becomes forward-biased and transistors 24 and 30 become conductive, so that both sides of coil 42 are at battery voltage. The coil thus remains unenergized so that relay contacts 40 remain open. Therefore, whether the ignition switch is opened or closed the headlamp circuit will operate normally through switch 34.

If the headlamps are off and then ignition switch 12 is opened, capacitor 26 discharges almost instantly through the gate to source diode of field effect transistor 24, the base emitter diode of transistor 30, relay coil 42 and resistor 44. Therefore, when the ignition switch is turned off with the headlamps off, all circuits will return to normal operation so that the parking lights 36 or headlamps 38 may be operated in the normal manner through switch 34.

If, however, the headlamps are on, being energized through switch 34, while the ignition switch is closed, voltage is applied through diode 32 and switch 34 to the drain of transistor 24 and the collector of transistor 30. When ignition switch 12 is opened before switch 34 is opened and considering the extremely high gate impedance of transistor 24, capacitor 26 must discharge through resistor 20 and link 22 to ground. As previously described, link 22 might suitably be the chassis of the vehicle in which this circuit is to be mounted. Note also that both diodes of transistor 16 are reverse-biased at this time. The reverse bias Zener voltage of the base emitter diode of this transistor is a fixed value of approximately 9 volts. The standard 12 volt automobile battery will have charged capacitor 26, when ignition switch 12 was closed, to battery voltage less the forward drop of the base-emitter diode of transistor 16. In this case the capacitor voltage will range from 9.4 volts to approximately 15.4 volts. Thus, initially, capacitor 26 will discharge very rapidly through the base-emitter diode of transistor 16 to 9 volts, after which this diode will cease to conduct and the capacitor will discharge as aforementioned through resistor 20 and link 22. The emitter of transistor 30 is now at approximately 9 volts and the low side 42a of the relay coil 42 is pulled toward ground when the forward bias on the base collector diode of transistor 16 is removed so that the relay closes. The circuit is now operative and the timing has begun. Relay contacts 40, which are parallel with headlamp switch 34, hold the headlamps on after the headlamp switch is turned off. After approximately minety seconds, which value is set by the value of capacitor 26 and resistor 20, together with the characteristics of the relay comprised of contacts 40 and coil 42, capacitor 26 is discharged enough so that it is below the voltage required to hold the relay closed and the relay drops out. This removes battery voltage from the headlamps and the timing circuit. All points of the timing circuit go to ground potential and no additional battery drain is possible.

If at any time the operator inadvertently activates the timing circuit when it is not desired, it is only necessary to return switch 34 to the off position and to momentarily close ignition switch 12, thus raising the voltage on point 42a and deenergizing relay coil 42.

From the above description, it can be seen that the only way to activate the timing circuit is to have both the headlamp switch 34 in the headlamp position and the ignition switch 12 closed, and then open the ignition switch before opening the headlamp switch.

Resistor 18 has been provided to limit the current flow through the base emitter diode of transistor 16 during initial charge of capacitor 26. Resistor 14 has been provided to insure that at the time ignition switch 12 is opened both diodes of transistor 16 becomes reverse biased.

It will be remembered that during the discharge of capacitor 26, after the voltage thereacross had dropped below the Zener voltage of the base emitter diode of transistor 16, the sole discharge path of the capacitor is through resistor 20. This is because of the extremely high gate resistance of field effect transistor 24 which is in the order of $10^8$ ohms. To achieve an extremely long time constant, resistor 20 can thus be made very large so that capacitor 26 capacitance and hence its physical size may be made quite small.

Additionally, the fact that the discharge path of capacitor 26 during the timing period of the circuits of either FIG. 1 or FIG. 2 is solely through resistor 20 provides a means of easily setting and testing the time period of the circuit. This is accomplished as follows. Referring to either FIG. 1 or FIG. 2, the conductive link 22 is removably inserted between terminals 21 and 23 so that the low voltage end of resistor 20 is grounded. The circuit, which may be either the circuit of FIG. 1 or the circuit of FIG. 2, is energized and the proper switches operated, in the manner previously described, to start the circuit timing period. At the completion of the timing period required of the time delay circuit conductive link 22 is removed from the circuit so as to interrupt the discharge path of capacitor 26 through resistor 20 to ground. The timing circuit thus becomes frozen at the then acquired electrical state. It is now only required to adjust the relay comprised of coil 42 and contacts 40 so that the contacts open at this electrical state. This may be done by either shorting or removing turns from relay coil 42 or more suitably by adjusting the spring tension urging contacts 40 toward the open position. Once thus adjusted it can be assured that the time delay circuit will continue to operate with this time delay period so that further testing or adjusting is not necessary.

Although we consider the above description and drawings to be the preferred embodiments of our invention, certain alterations and modifications will become apparent to one skilled in the art. Therefore, not wishing to limit our invention to the specific form shown, we hereby claim as our invention all the subject matter, including modifications and alterations thereof encompassed by the true scope and spirit of the appended claims.

The invention claimed is:

1. Timing means for automatically disconnecting an electrical load from a power source having first and second terminals after a fixed timing period comprising:
   a relay having normally open contacts connected between said second terminal of said power source and one side of said electrical load, the other side of said electrical load being connected to said power source first terminal and an operating coil having first and second ends;
   passive means for connecting said operating coil first end to said power source first terminal;
   a discharge circuit;
   switching means for charging said discharge circuit from said power source;
   a field effect transistor having gate, drain and supply terminals, said field effect transistor being connected to said discharge circuit so as to bias said field effect transistor into conductance when said discharge circuit is fully charged and during a predetermined percentage comprising said timing period; and
   means responsive to said field effect transistor when conductive for energizing said relay coil second end.

2. Timing means as recited in claim 1 wherein said gate terminal is connected to said discharge circuit and said energizing means comprises:
   a transistor having a collector-emitter circuit connected between said operating coil second end and said power source second terminal and a base electrode connected in the drain-supply circuit of said field effect transistor; and
   a diode for connecting said power supply second terminal to said drain-supply circuit when said relay contacts are closed.

3. Timing means as recited in claim 2 wherein said switching means comprises a momentary contact switch, said discharge circuit being connected to be charged by said power source when said momentary contact switch is closed and being disconnected from said power source when said momentary contact switch is opened.

4. Timing means as recited in claim 3 wherein said discharge circuit comprises a parallel connected RC circuit arranged to be charged from said power source when said momentary contact switch is closed and to be discharged when said momentary contact switch is opened.

5. Timing means as recited in claim 4 wherein said parallel connected RC circuit comprises a capacitor shunted by a resistor, said capacitor discharging through said resistor when said momentary contact switch is opened.

6. Timing means as recited in claim 5 with additionally a removable electrically conductive link inserted in the discharge path of said capacitor whereby said capacitor is substantially frozen at its acquired electrical state when said link is removed.

7. Timing means as recited in claim 1 wherein said passive connecting means comprises a resistor and said switching means comprises:
   a first transistor having an emitter collector circuit connected between said gate terminal and said relay coil first end, and a base electrode; and
   a first normally open switch for applying a forward bias to said base electrode from said power source whereby said field effect transistor is biased conductive and said relay coil first end is energized when said first switch is closed; and wherein said energizing means comprises;
   a power terminal;
   a second transistor having a collector-emitter circuit connected between said operating coil second end and said power terminal, and a base electrode, the drain-supply circuit of said field effect transistor being connected between said power terminal and said second transistor base electrode; and
   a diode connected between said power terminal and said one side of said electrical load; and wherein said timing means additionally includes a second switch shunting said relay contacts.

8. Timing means as recited in claim 7 wherein said discharge circuit comprises:
   a resistor connected between said gate electrode and said power supply first terminal; and
   a capacitor shunting said resistor, the RC values of said resistor and capacitor being determinative of said timing period.

9. Timing means as recited in claim 8 with additionally a removable electrically conductive link inserted in said capacitor discharge path.

References Cited

UNITED STATES PATENTS

| | | | |
|---|---|---|---|
| 3,058,030 | 10/1962 | Simpkins | 315—83X |
| 3,233,186 | 2/1966 | Theriault | 307—304X |
| 3,300,585 | 1/1967 | Reedyk et al. | 307—304X |
| 3,392,352 | 7/1968 | White | 307—304X |
| 3,423,633 | 1/1969 | Kawal et al. | 315—83 |

JAMES W. LAWRENCE, Primary Examiner

C. R. CAMPBELL, Assistant Examiner

U.S. Cl. X.R.

315—77, 79, 82; 340—322